May 28, 1968  A. L. GAINES  3,385,469
NUT AND PRE-TENSIONED BOLT APPARATUS AND METHOD OF
ASSEMBLY THEREOF FOR SECURING MEMBERS TOGETHER
Filed July 22, 1966  2 Sheets-Sheet 1

INVENTOR
ALBERT L. GAINES

By Robert L. Olson
ATTORNEY

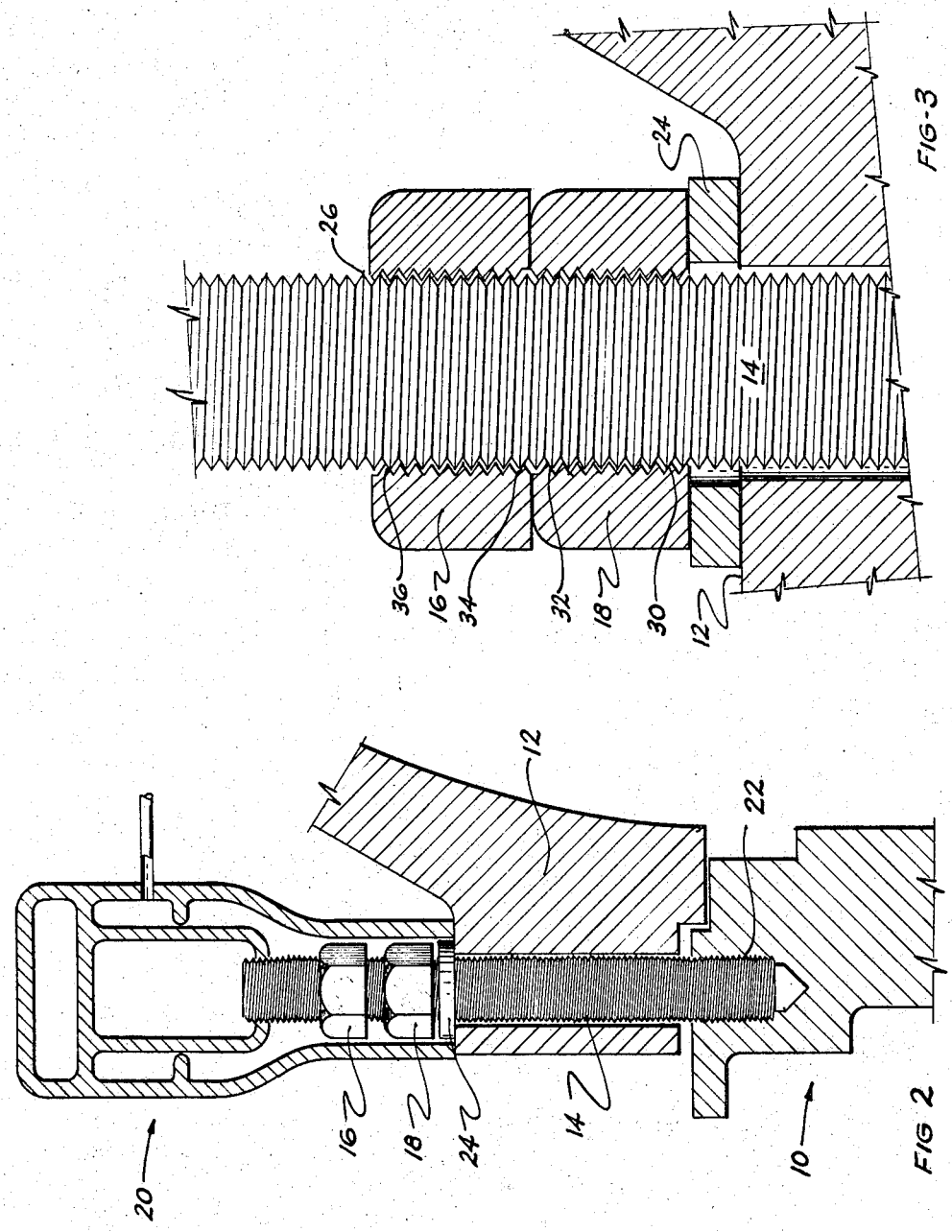

3,385,469
NUT AND PRE-TENSIONED BOLT APPARATUS
AND METHOD OF ASSEMBLY THEREOF FOR
SECURING MEMBERS TOGETHER
Albert L. Gaines, Simsbury, Conn., assignor to Combustion Engineering, Inc., Windsor, Conn., a corporation of Delaware
Filed July 22, 1966, Ser. No. 567,124
4 Claims. (Cl. 220—55)

This invention is directed to nut and bolt apparatus, and the method of assembly thereof, for holding two members together, and in particular to such assemblies wherein pretensioning of the bolt is utilized during initial assembly of the apparatus.

In recent years, stud tensioners, for preloading or pretensioning the closure studs or bolts on high pressure vessels have been frequently used. The very large diameter closure studs which are presently used, require nut lengths of such dimensions that bolt pretensioning cannot be readily employed any longer. The pretensioning elongates the stud to the extent that the strain developed in the stud material exceeds the pitch clearance in the design of the threads over the length of the nut. As a result, the nut binds in the threads when the pretensioning is placed on the stud, and tightening of the nut against the closure cannot be accomplished. A relaxation of the tolerances on the thread design of the nut is sometimes practiced to avoid interference between the threads of the strained stud and the unstrained nut of the required length. This is not desirable, since it weakens the thread design strength.

It is an object of this invention to utilize two or more nuts with each bolt, thereby reducing the length of unstrained nut material facing the strained, or pretensioned, bolt material. By utilizing a plurality of nuts with each bolt, the product of the strain times the length of the nut is kept less than the clearance dimensions of the threads on the bolts and nuts, thus allowing their initial assembly with ease.

Other objects, features, and advantages of the present invention will become apparent from the following detailed description taken in conjunction with the accompanying drawings, in which:

FIGURE 2 is an enlarged view of one of the nut and bolt assemblies including a schematic representation of apparatus for pretensioning the bolt; and FIGURE 3 is an enlarged view of one of the nut and bolt assemblies, showing the interaction of the threads thereof while the bolt is pretensioned.

Figure 1:
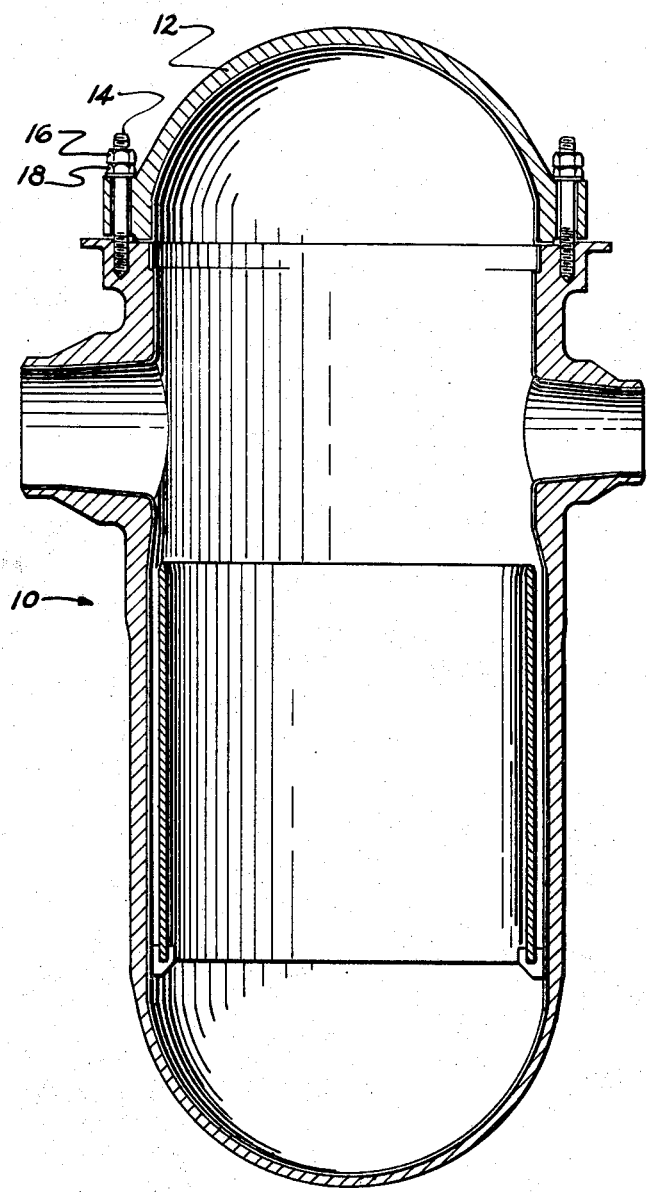
FIGURE 1 is a schematic arrangement of a pressure vessel having a removable cover secured thereto by nuts and bolts in accordance with the invention.

Looking now to FIGURE 1 of the drawings, numeral 10 depicts a pressure vessel which during normal operation will be maintained under very high pressure, for example 5000 p.s.i. Removable cover 12 is secured to the vessel 10 by means of a plurality of bolts 14 and nuts 16 and 18, which nut and bolt assemblies are distributed around the entire periphery of the dome or cover 12.

FIGURE 2 shows an enlarged view of one nut and bolt assembly, including means for pretensioning the bolt. Stud or bolt 14 contains a lower threaded portion which can be utilized to secure the bolt to vessel or housing 10. A pair of nuts 16 and 18 are used to secure the cover 12 to the vessel, after the bolt 14 has been pretensioned by the pretensioning apparatus 20. A washer 24 is positioned between the lower nut 18 and the top of the cover 12.

Stud tensioner apparatus 20 contains a member which is threaded to the top of bolt 14, so that a suitable force can be exerted, placing the bolt in tension before the nuts are tightened. Any suitable mechanism can be used for applying the tensioning force to the bolt 14. An apparatus commonly used is a hydraulic piston-cylinder arrangement.

The pretensioning force exerted on the bolt causes stretching of the bolt material, thus elongating the threads thereof. The pretensioning force is maintained on the bolt while first the lower nut 18 is threaded downwardly until it is in contact with washer 24, and then nut 16 is threaded downwardly until it comes into contact with the upper surface of nut 18. The pretensioning force can then be removed, and the tension will be locked into the bolt by means of the nuts.

FIGURE 3 illustrates the nut and bolt assembly after the nuts have been tightened down into place, but before the pretensioning force has been removed. As shown, the threads 26 of bolt 14 have been elongated to such an extent that the lowest thread 30 of nut 18 is in contact with the lower surface of the coacting thread on bolt 14. The uppermost thread 32 of nut 18 is in contact with the upper surface of the coacting thread on bolt 14. The same thing is true of lower and upper threads 34 and 36 of the upper nut 16.

Thus it can be seen that if only one nut were used, having an axial length equal to the combined axial length of nuts 16 and 18, there would be interference of the threads which would prevent the nut from being tightened down on the pretensioned bolt.

The number of nuts used with each bolt depends on the amount of elongation of the pretenisoned bolt, and the thread clearance. For example, if a greater pretensioning force were applied to the bolt 14 shown in FIGURE 3, thereby causing increased axial spreading of the threads, then more than two nuts would have to be used to prevent binding or interference of the threads during tightening of the nuts on the pretentioned bolt.

The manner of assembling the apparatus will now be described. Cover 12 is placed in position on vessel 10. Bolts or studs 14 are then firmly secured to vessel 10 by means of the lower threaded portions 22. A washer 24 is placed on each bolt, and nuts 16 and 18 are thereafter loosely threaded onto the bolts. Stud tensioner device 20 is then used to pretension each bolt by means of a predetermined force, to place a stress of for example 40,000 p.s.i. on each stud or bolt. While these bolts 14 are subject to the pretensioning force, nuts 18 and 16 are threaded downwardly to their tightened position (as shown in FIGURE 3). The stud tensioner can then be removed. After all of the nuts and bolts have been so assembled simultaneously, or in selected sequence to obtain this result, the vessel can be pressurized, and begin its normal operation. When it is desired to remove the cover 12 from vessel 10, for example at the time of an annual maintenance inspection, the stud tensioner would again be used for ease of disassembly of the nuts and bolts.

The purpose of pretensioning the bolts prior to pressurizing the vessel should be obvious. If the bolts were not pretensioned during initial assembly of the nuts and bolts, then when the vessel were pressurized, this pressure acting through the cover would result in a force which would be distributed among the studs or bolts, which would cause elongation of the bolts, thereby allowing fluid leakage between the vessel and cover. The bolts should be pretensioned by a force somewhat greater than the force they will ever be subjected to during normal operation of the pressure vessel. This will ensure a good seal of the gasket being maintained between the vessel and cover at all times.

The diameter of the bolts, and the material they are to be made of, must be such that they can withstand the pretensioning force and the normal operating pressure without failure. The pretensioning force used on any given sized bolt should not be of such magnitude so as to stretch the bolt beyond its elastic limit, so that permanent deformation takes place.

The size, number and material of the bolts is initially determined by the pressure the pressure vessel normally contains, and the area of the dome or cover exposed to such pressure. By multiplying the pressure times the cross-sectional area of the dome and dividing by the number of bolts, and the cross-sectional area of each bolt, the p.s.i. stress which each bolt will be subjected to can be calculated. With proper factor for gasket loading this will also determine the amount of pretensioning and therefore elongation, to which each of the bolts should be subjected. In conjunction with pitch tolerances and thread clearances, the axial length of nut material which should be used and that will present sufficient bearing surface in the threads to withstand the force to which they are subjected can be determined. The pretensioning force should be sufficiently large to place a stress on each bolt which is larger than the stress created by the pressure in the vessel, so as to ensure a proper seal.

From the pretensioning force to be used and the diameter of the bolt, the amount of elongation of the bolt can be determined; i.e. strain equals the stress divided by the modulus of elasticity for any given material.

The pitch diameter clearance for any given sized stud and nut of a particular manufacturer is predetermined. Thus, for example, if pretensioning causes the elongation of a given bolt of a magnitude of .01 inch per inch, the pitch diameter clearance is known to give an axial thread tolerance of .03 inch, and the axial length of nut needed to coact with the bolt is 6 inches, the number of nuts that should be used to make up the 6 inches can be readily determined. By multiplying 6 (inches) times .01 (elongation in inches per inch), then dividing by .03 (thread axial clearance), the answer is that 2 nuts should be used to make up the required 6 inch axial length; thus 2 nuts, each 3 inches in axial length, would be used with each bolt in the above example. In order to ensure against any discrepancies in pitch diameter clearances in nuts and bolts, 3 two-inch nuts could also be used in the above example, if desired.

Looking at FIGURE 3 (showing the stud in prestressed condition), it can be seen that when the pretensioning force is removed from the upper end of bolt 14, the stud thread touching the upper thread 36 of upper nut 16 will be released from tension, and thus will move downwardly to its normal nonstressed position. The same is true of all of the stud threads coacting with upper nut 16, with the exception of the lowest stud thread coacting with 34. Thus, immediately following release of the pretensioning force, the pretensioning force will be locked into the lowest stud thread coacting with thread 34 of upper nut 16. There will be elastic deformation of this thread, so that the pretensioning load will be distributed over a greater area, until it can be supported by the thread material. When thread 34 first starts deforming, part of the load will then be picked up by lower thread 30 of lower nut 18. As this thread 30 of lower nut 18 also starts deforming, the load will be picked up also by the threads directly above thread 34 of upper nut 16, and directly above thread 30 of lower nut 18.

In order to get equal distribution of the load in both nuts, it might be advisable to use a deformable washer of a given height between the nuts 16 or 18; or to use a predetermined tightening force in tightening the lower nut 18, instead of just making both nuts hand tight.

While it will be apparent that the embodiment of the invention herein disclosed will fulfill the objects of the invention, it will be appreciated that the invention is susceptible to modification, variations, and change without departing from the proper scope or fair meaning of the following claims.

What I claim is:

1. In combination, a pressure vessel having an opening therein, closure means for covering the opening, bolt means and associated nut means for securing the closure means to the pressure vessel, there being at least two nut means associated with each bolt means, means exerting a pretensioning force for pretensioning the bolt means during assembly of the bolt means and nut means, the pretensioning force being great enough such that there would be interference between the threads of the bolt means and nut means if only one nut means were associated with each bolt means during application of the pretensioning force, the number of nut means associated with each bolt means being such that they are capable of withstanding the force exerted by the pressure within the pressure vessel, and also such that there is no interference of the threads of the bolt means and nut means during assembly thereof.

2. In combination, a first member, a second member, means exerting a force tending to separate the first and second members during the normal use thereof, bolt means and associated nut means for securing the first and second members together, there being at least two nut means associated with each bolt means, means exerting a pretensioning force for pretensioning the bolt means during assembly of the bolt means and nut means, the pretensioning force being great enough such that there would be interference between the threads of the bolt means and nut means if only one nut means were associated with each bolt means during application of the pretensioning force, the axial length of each nut means and the number of nut means associated with each bolt means being such that they are capable of withstanding the force tending to separate the first and second members, and also such that there is no interference of the threads of the bolt means and nut means during assembly thereof.

3. The method of securing a cover to an opening in a pressure vessel by means of bolts and nuts, comprising the steps of initially placing tension on the bolts during assembly of the bolts and nuts, tightening at least two nuts onto each bolt during the assembly of the bolts and nuts, the amount of tension placed on the bolts during assembly being sufficient such that if only one nut were used with each bolt there would be interference between the threads of the bolts and nuts, the number of nuts being used on each bolt being such that they can withstand the force being exerted by the pressure within the vessel, and also such that there is no interference between the threads of the bolts and nuts during assembly thereof.

4. The method of securing a first member and a second member together by means of bolts and nuts, which members are subjected to a force tending to separate them during normal operation, comprising the steps of initially placing tension on the bolts during assembly of the bolts and nuts, tightening at least two nuts onto each bolt during the assembly of the bolts and nuts, the amount of tension placed on the bolts during assembly being sufficient such that if only one nut were used with each bolt there would be interference between the threads of the bolts and nuts, the number of nuts being used on each bolt being such that they can withstand the force tending to separate the first and second members, and also such that there is no interference between the threads of the bolts and nuts during assembly thereof.

No references cited.

THERON E. CONDON, *Primary Examiner.*

J. B. MARBERT, *Assistant Examiner.*